United States Patent [19]
Hockenberry et al.

[11] Patent Number: 5,350,595
[45] Date of Patent: Sep. 27, 1994

[54] METHOD FOR CONTINUOUS MANUFACTURE OF PROCESS CHEESE-TYPE PRODUCTS

[75] Inventors: Thomas M. Hockenberry, Evanston; Anthony J. Mack, Arlington Heights, both of Ill.

[73] Assignee: Kraft General Foods, Inc., Northfield, Ill.

[21] Appl. No.: 169,746

[22] Filed: Dec. 17, 1993

Related U.S. Application Data

[63] Continuation of Ser. No. 882,515, May 13, 1992, abandoned.

[51] Int. Cl.$^5$ .............................................. A23C 19/08
[52] U.S. Cl. ...................................... 426/582; 426/510; 426/511; 426/519; 426/520; 426/522
[58] Field of Search .............. 426/522, 520, 510, 511, 426/582, 519; 99/367, 453, 460

[56] References Cited

U.S. PATENT DOCUMENTS

| | | | |
|---|---|---|---|
| 1,639,828 | 8/1927 | Wheeler et al. | 426/511 |
| 1,713,537 | 5/1929 | Kux | 99/453 |
| 1,796,445 | 3/1931 | Doering et al. | 99/330 |
| 1,861,721 | 6/1932 | Scott | 426/511 |
| 1,923,358 | 8/1933 | Eckberg | 99/2 |
| 2,021,899 | 11/1935 | Schneider | 99/11 |
| 2,939,770 | 6/1960 | Schwartzkopff et al. | 23/283 |
| 3,286,992 | 11/1966 | Armeniades et al. | 259/4 |
| 3,704,006 | 11/1972 | Grout et al. | 259/4 |
| 3,773,753 | 11/1973 | Wright et al. | 260/209.6 |
| 3,794,300 | 2/1974 | Harder | 259/4 |
| 4,037,825 | 7/1977 | Burgert | 259/4 R |
| 4,112,131 | 9/1978 | Bosy et al. | 426/582 |
| 4,448,539 | 5/1984 | Burgert | 366/132 |
| 4,483,624 | 11/1984 | Bacon, Jr. et al. | 366/293 |

*Primary Examiner*—Helen Pratt
*Attorney, Agent, or Firm*—Fitch, Even, Tabin & Flannery

[57] ABSTRACT

The present invention is directed to a continuous method for making a process cheese-type product. In the method, a flowing stream of a process cheese-type formulation which includes cheese particles and an emulsifying salt is provided. Steam is injected into the stream of the process cheese-type formulation. The stream of the process cheese-type formulation is then subjected to a mixing process in a chamber having an auger to provide a process cheese-type product. The stream of the process cheese-type product is then transported to a holding tank prior to packaging the process cheese-type product.

11 Claims, 3 Drawing Sheets

METHOD FOR CONTINUOUS MANUFACTURE OF PROCESS CHEESE-TYPE PRODUCTS

This application is a continuation of application Ser. No. 882,515, now abandoned, filed May 13, 1992.

FIELD OF THE INVENTION

The present invention relates generally to the cooking of cheese to provide a process cheese-type product. More particularly, the present invention relates to a continuous in-line method and apparatus for the control of cooking in the manufacture of process cheese-type products.

BACKGROUND OF THE INVENTION

As used herein, the term "process cheese-type products" includes those products known and referred to as "pasteurized process cheese", "pasteurized process cheese food", "pasteurized process cheese spread" and "pasteurized process cheese product". "Process cheese type-products" also includes products resembling process cheese, process cheese food, process cheese spread and process cheese product, but which may not meet the U.S. Federal Standards of Identity for any of the above products in that they contain ingredients not specified by such Standards, such as vegetable oil or vegetable protein, or do not meet the compositional requirements of such Standards. Process cheese-type products also includes any product having the flavor and texture of a process cheese-type product regardless of the ingredients or manufacturing steps employed, and regardless of whether the Standards which exist are met.

Natural cheese is generally made by taking animal milk, developing acidity and setting the milk with a clotting agent, such as rennet, or by developing acidity to the isoelectric point of the protein. The set milk is cut and whey is separated from the resulting curd. The curd may be pressed to provide a cheese block and curing takes place over a period of time under controlled conditions. A product having flavor and body characteristics of natural cheese has been made by replacing at least a portion of the animal fat of the milk with a vegetable fat, such as corn oil and/or by replacing at least a portion of the casein of the milk with an analog protein.

It is well known to provide a product having some of the characteristics of natural cheese by grinding a natural cheese, and heating it with an emulsifying salt. The name given to the resulting product depends upon the ingredients used and its composition and, in some instances, is determined by regulations promulgated by the U.S. Food and Drug Administration 21 C.F.R. §133.169–180. For example, the term "pasteurized process cheese" refers to a product comprising a blend of cheeses to which an emulsifying agent, usually an emulsifying salt, and possibly acids, are added; the mixture is then worked and heated into a homogeneous plastic mass.

The term "pasteurized process cheese food" refers to a product which is prepared from the same materials and the same processes used for manufacture of process cheese. However, cheese food generally has dairy ingredients added thereto, such as cream, milk, skimmed milk, whey or any of these from which part of the water has been removed (e.g., concentrated skimmed milk). The moisture level in process cheese food is generally higher than that of process cheese and may be up to about 44%. Fat is present at a level of not less than 23%.

The term "pasteurized process cheese spread" refers to a product which is similar to cheese food, in the sense that it can contain the indicated dairy ingredients. Process cheese spread, however, may have a moisture level as high as 60%. The minimum fat level for cheese spread is 20%.

Process cheese, process cheese food and process cheese spread are referred to as "standardized products", since their method of manufacture and composition are determined by Federal Standards of Identity.

In prior manufacture of process cheese-type products, two forms of batch cookers have been generally known, one being a steam jacketed kettle equipped with a mechanical agitator and the other being a horizontally extending cooker also known as a "lay-down" cooker having a screw in the cooker chamber. Live steam is injected directly into the chamber and the raw material at atmospheric pressure is agitated by the screw. The raw material is heated in the cooker to a temperature of at least 150° F., usually about 160° F. to 190° F., and is held at that temperature for at least 30 seconds, but usually for about 5 minutes, depending in part upon the raw material and the desired cheese product.

The conventional cheese cookers used in the manufacture of process cheese products are essentially batch-type cookers in which an amount of raw material is introduced into the cooker, and heated and agitated to provide a homogenized molten mass. The molten mass is then intermittently discharged from the cooker for appropriate handling.

The design and operation of the cooker is critical in obtaining a good process cheese product. Mere heating of the cheese blend without proper agitation results in separation of the fat, thus failing to provide a satisfactory emulsion. Too much agitation during heating results in over-emulsification and a process cheese product having undesirable body characteristics. Also, maintenance of the process cheese at the cooking temperatures for an extended period of time is undesirable and burn-on of the cheese onto the sides of cookers has been a problem.

When the cheese has been cooked to the degree desired, which can be readily determined by one skilled in the art, the molten process cheese product is withdrawn from the cooker, cooled to a proper packaging or filling temperature and packaged. Packaging may take any one of a number of forms, for example, loaves or jars. Alternatively, the molten process cheese product may be formed into slices by distributing the product upon the surface of a cooled rotating chill roll in the form of a thin layer which solidifies into a sheet which is removed from the chilled surface of the roll, cut into strips and subsequently into slices followed by packaging of the sliced process cheese product.

U.S. Pat. No. 4,112,131 to Bosy, et al. is directed to a continuous in-line process for the manufacture of process cheese products. In the method, a raw material comprising a uniform blend of cheese materials is conveyed under pressure through a heating zone and a mixing zone to provide a homogeneous molten cheese mass having a moisture of from about 42% to about 75% under pressure of from about 5 psig to about 60 psig in the mixing zone at a temperature of from about 165° F. to about 300° F. Steam is injected directly into the cheese materials in the heating zone in a confined region and the steam is substantially condensed within the confined region, thus heating and melting the cheese materials to provide the molten cheese mass. The molten cheese mass is delivered from the heating zone to a static mixing zone where the steam is further mixed with the cheese and the temperature of the molten cheese is equilibrated. The molten cheese mass is then delivered from the mixing zone to a cooling zone having a pressure lower than the pressure of the mixing zone.

U.S. Pat. No. 2,021,899 to Schneider is directed to a prior art horizontal cooker wherein cheese particles are heated to a molten mass by a combination of steam injection and jacket heating. The horizontal cooker of the Schneider patent is provided with a screw conveyor for conveying and mixing the cheese particles as they are being heated in a batch process. At the outset of a run, the cheese particles are agitated within the cooker as steam is introduced directly into the material, while at the same time hot water is maintained in the jacket. After a molten mass is obtained, the molten mass is recirculated by means of a pump through a strainer and back into the cooking chamber. During the recirculation, the steam injection is stopped. The circulation of the molten mass is continued until the molten mass is of a thin, creamy consistency. Thereafter, the molten mass is pumped to a chamber wherein further steam is injected into the molten mass to raise the temperature to between 212° F. and 245° F. The material exits from the mixing chamber into a vacuum chamber where further body is developed. The vacuum is then cut and the contents of the vacuum pan are packed while hot.

U.S. Pat. No. 1,639,828 to Wheeler, et al. is directed to a prior art method of treating cheese to produce process cheese. In the process of the Wheeler, et al. patent, finely divided cheese is fed into the hopper of a cylindrical horizontal cooker. The cooker is provided with paddles to agitate the cheese particles as they progress down the length of the cylindrical horizontal cooker. Steam is introduced into the sides of the horizontal cooker by means of a heat manifold and steam jets located in the sides. As the cheese particles progress along the length of the cooker, they are heated by the steam and agitated by the paddles and a screw conveyor to provide a molten cheese mass. After cooking, the cheese mass exits from the end of the horizontal cooker into a package.

U.S. Pat. No. 1,796,445 to Doehring, et al. describes a continuous horizontal cheese cooker whereby a series of cookers are interconnected and the cheese particles are gradually heated by subjecting the cheese to different temperature conditions in the successive cookers in a continuous process.

It is evident from the extended history relating to the development of process cheese cookers that considerable research has been expended to understand the physico-chemical processes which occur during the manufacture of process cheese-type products. In order for process cheese-type products to have the correct texture, flavor and meltability attributes, they must undergo a specific temperature and shear history. A certain time at elevated temperatures is required to cook the cheese curd into a continuous phase and to eliminate uncooked cheese or "curd specks". In addition to the elevated temperature, a certain degree of agitation at specific shear values is required to facilitate the melting of the cheese and to emulsify the fat in the system.

If the shear from this agitation is excessive, the fat becomes over-emulsified causing defective texture, i.e., the process cheese-type product becomes too firm and rubbery and it will have restricted melting ability in applications such as hot sandwiches. Hence, the amount of time the process cheese-type product experiences at any given conditions of shear and temperature are critical to the finished product attributes.

Accordingly, it is a principal object of the present invention to provide a continuous method for the manufacture of process cheese-type products wherein the shear, temperature and residence time are controlled to provide a process cheese-type product having the correct texture, flavor and meltability attributes.

Another object of the present invention is to provide a method and apparatus for the continuous in-line cooking of a process cheese-type formulation, particularly by the direct introduction of steam into a flowing stream of the raw materials used to provide the process cheese-type product.

These and other objects of the invention will become apparent from the following detailed description and the attached drawings.

SUMMARY OF THE INVENTION

Figure 1:
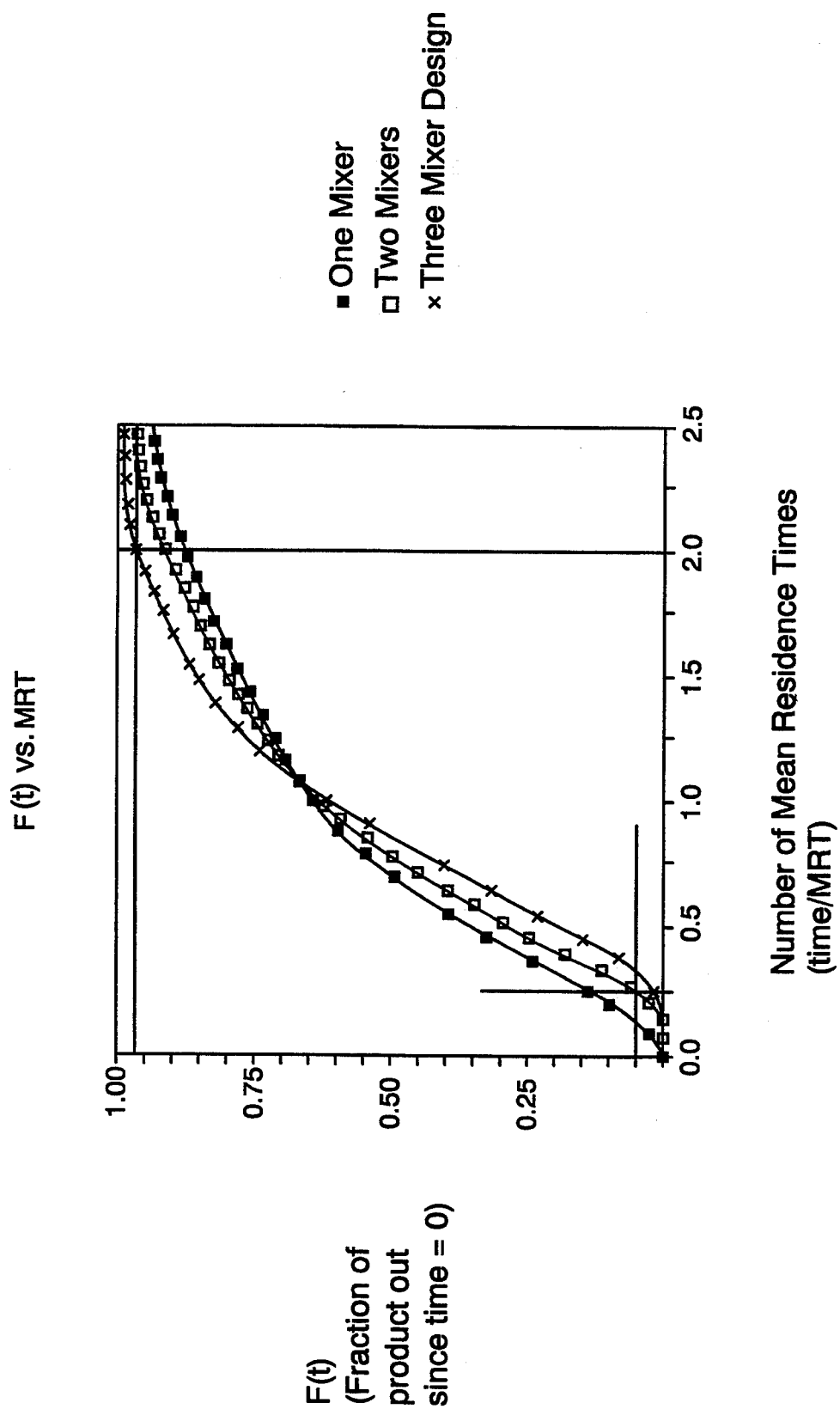
FIG. 1 is a graph plotting fraction of product out since time zero versus the number of mean residence times.

The present invention is directed to a continuous method for making a process cheese-type product. In the method, a flowing stream of a process cheese-type formulation which includes cheese particles and an emulsifying salt is provided. Steam is injected into the stream of the process cheese-type formulation. The stream of the process cheese-type formulation is then subjected to a mixing process in a chamber having a vertically mounted auger to provide a process cheese-type product. The stream of the process cheese-type product is then transported to a holding tank prior to packaging the process cheese-type product.

The chamber containing the auger is divided into at least three mixing chambers by affixing at least two baffles to the shaft holding the auger. The baffles serve to divide the chamber into three separate vertical mixing chambers to provide the effect of three separate mixing chambers joined in series.

DETAILED DESCRIPTION OF THE INVENTION

In general, the present invention is directed to a process for the continuous cooking of process cheese-type products. The process combines optimum levels of hold time, temperature, mechanical shear and product residence time distribution to yield a product of improved quality.

For a typical process cheese-type product, the following parameters are important during the cooking portion of the process. The temperature should be in the range of from about 150° F. to about 250° F. The residence time inside the mixer should be from about 30 seconds to about 8 minutes with a preferred operating range of about 2 minutes to about 4 minutes. The residence time distribution should be such that no more than about 5% of the process cheese product passes through the mixer in less than about 0.25 of the mean residence time of the flowing stream of process cheese in the mixer and at least about 95% of the process cheese product should have passed through the mixer within about two mean residence times of the flowing stream of process cheese in the mixer. All percentages used herein are by weight and all temperatures are in degrees Fahrenheit, unless otherwise indicated.

A minimum amount of mechanical shear is required to facilitate heat transfer into uncooked cheese particles. As calculated by dividing the difference in velocities between two adjacent surfaces by the distance between them, this shear should be at least about 5 (1/sec) for a major portion of the process cheese-type formulation in the volume of the cooker, preferably greater than about 70%. If the shear is excessive, however, damage will be done to shear sensitive components in the finished product. The maximum shear that a minor portion of the process cheese-type formulation, preferably less than about 10% of the product, should be subjected to is about 1000 (1/sec), preferably this portion of the product should be subjected to shear less than about 500 (1/sec).

In accordance with the method and apparatus disclosed herein, process cheese-type products are prepared on a continuous in-line basis by providing a flowing stream of a process cheese-type formulation comprising a uniform blend of cheese and/or a cheese curd with appropriate additives. The flowing stream of the process cheese-type formulation is provided by pumping the raw materials through a conduit. Steam is injected directly into the raw material in a confined region. Sufficient steam is introduced into the cheese formulation to provide a molten mass, and generally sufficient steam is introduced to heat the molten mass to a temperature in the range of from about 150° to about 250° F. prior to entrance into the mixing apparatus of the invention.

The flowing stream of the process cheese-type formulation is then subjected to a mixing process. In accordance with the invention, it has been determined that the cooking and mixing parameters discussed hereinabove can be obtained by subjecting the flowing stream of the heated process cheese-type formulation to mixing in a series of vertically oriented auger type mixers. The molten cheese is then delivered to a surge tank prior to packaging. The molten cheese may be delivered from the mixers to a cooling zone usually having a pressure lower than the pressure in the mixers. As the molten cheese passes from the mixers to the cooling zone, expansion of the molten cheese takes place causing deaeration and vaporization of a portion of the moisture in the molten cheese.

Figure 3:
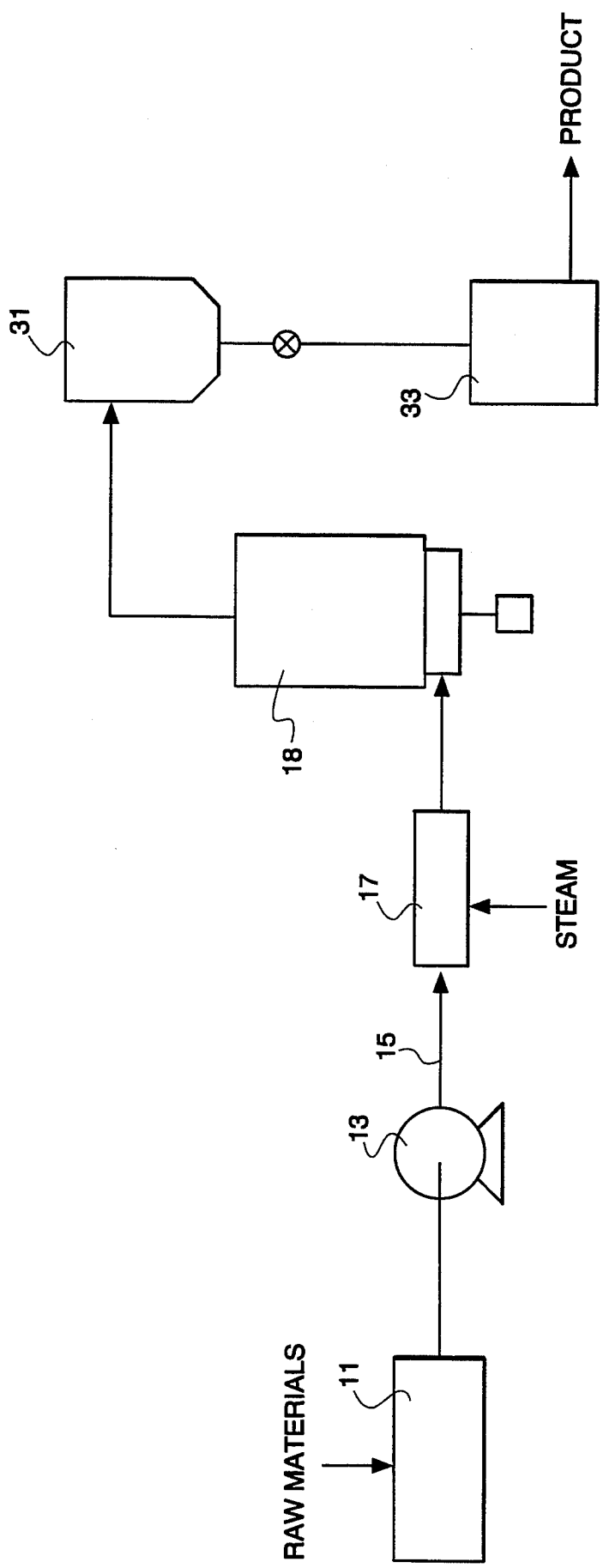
FIG. 3 is a schematic flow chart of the process of the invention.

Referring now to FIG. 3, there is illustrated a schematic flow diagram of one embodiment of the invention. A blend of the raw materials of the process cheese-type formulation, which may include one or more natural aged cheeses, short held cheese and current cheese which have been comminuted in conventional grinders and whey, cream, condiments, emulsifiers, as may be desired in the final process cheese-type product, are delivered to an auger 11. The auger 11 provides a positive supply of the raw materials to a pump 13. The pump 13 provides a flowing stream of the raw materials in conduit 15. The flowing stream of raw material passes through a steam infuser 17. The steam infuser 17 may be any suitable type such as described in U.S. Pat. No. 4,112,131 to Bosy, et al.

The flowing stream of raw material then passes through a vertically oriented auger conveyor 18. In accordance with the invention, it has been determined that mixing to attain the mixing parameters defined hereinabove cannot be attained in a single vertical auger conveyor. The mixing conditions require the use of at least three vertically oriented auger conveyors piped in series.

Figure 2:
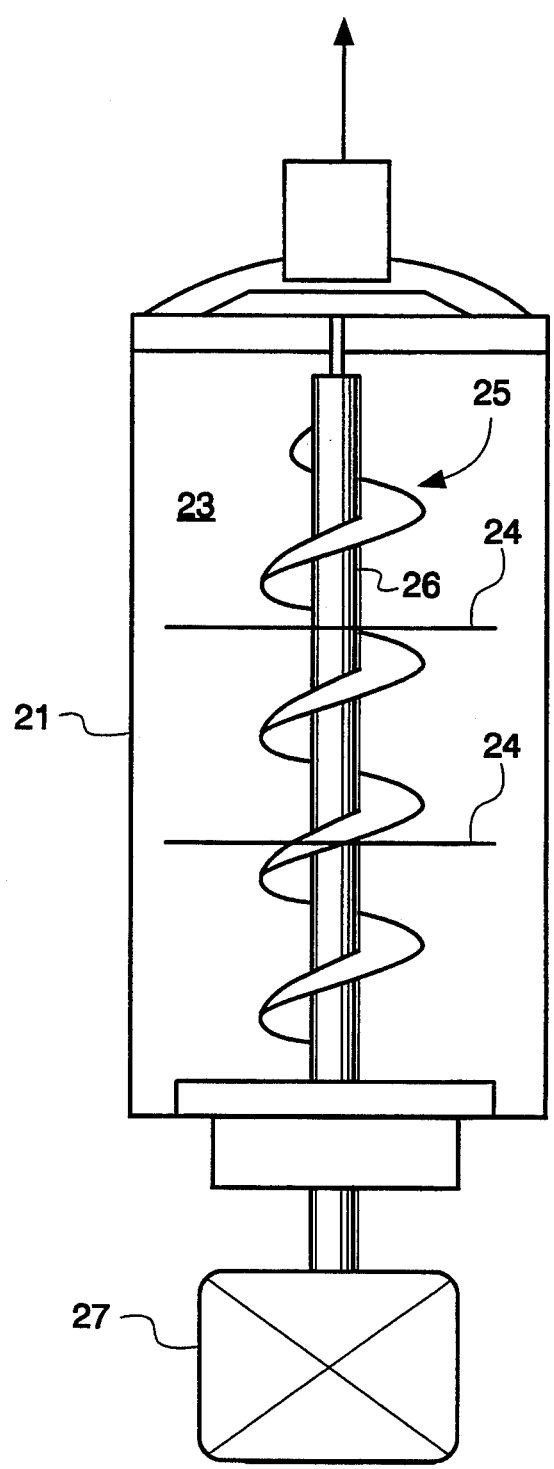
FIG. 2 is a schematic cross-sectional view of the mixing apparatus of the invention.

In an important embodiment of the present invention, it has been determined that the mixing conditions provided by use of a series of three vertically oriented auger conveyors can be simulated through use of a single auger conveyor 18 modified as depicted in FIG. 2. The auger conveyor consists of a cylindrical housing 21 which defines a mixing chamber 23. The shaft 26 of the auger 25 is journaled along the central axis of the cylindrical housing. The auger is driven by motor 27.

The single auger conveyor has been modified to provide two circular baffles 29 which are affixed to the shaft of the auger conveyor at spaced intervals within the mixing chamber of the auger conveyor. The baffles are spaced an equal distance apart to provide three chambers through which the heated product passes. Each of the chambers simulates the mixing properties of a single auger type conveyor.

As shown in FIG. 1, the mean residence time requirements of the invention are not attained through use of a single or two auger conveyors in series. The single mixer plot was obtained by using a single auger conveyor without baffles. The two mixer plot was obtained by using two auger conveyors without baffles which were piped in series. The three mixer plot was obtained by using the same mixer used for the one mixer plot, but which had two circular baffles spaced equally which were welded to the auger shaft to provide three equal sized mixing chambers. It can be seen that the mean residence time requirements are attained through use of the single vertically oriented auger conveyor having two baffles to provide three chambers.

After passing through the mixing section, the product is transferred to a flash chamber 31 to evaporate the moisture prior to transporting the product to surge tank 33. If the level of moisture provided by the steam is accounted for when preparing the process cheese-type formulation, the flash chamber can be bypassed and the product can pass directly to a surge tank 33 through a suitable bypass line for subsequent loading into suitable containers.

As an example of the present invention, an auger conveyor was manufactured having a 6.25-inch internal diameter and a length of 21 inches. Two circular baffles were welded to the auger shaft in such a way that the flights of the auger were split into three approximately equal lengths creating three approximately equal mixing sections. The baffles were 5 inches in diameter to provide a clearance from the wall of the mixing chamber of 5/8 inch. The auger was operated at a speed of 1350 rpm. 8.5 pounds per minute of a process cheese-type formulation was pumped through a conduit to the auger mixer. The cheese product was heated to a temperature of 190° F. by steam injection prior to entering the mixer. The process cheese-type product was then transferred to a surge tank prior to being packaged into containers.

What is claimed is:

1. A method for manufacture of a process cheese-type formulation comprising:
   (a) providing a flowing stream of a process cheese-type formulation;

(b) injecting steam into said flowing stream; and
(c) subjecting said flowing stream to a mixing process to uniformly distribute said injected steam throughout said flowing stream, said mixing being accomplished by passing said flowing stream upwardly through a vertically oriented mixing chamber having a plurality of mixing sections whereby said flowing stream passes through each mixing section, each of said sections having means for imparting forward movement and shear to said flowing stream, said mixing chamber being an auger type conveyor divided into at least two mixing sections by affixing at least one circular baffle plate to the shaft of said conveyor, the residence time distribution of said flowing stream through said auger conveyor being such that no more than about 5% of the process cheese-type formulation passes through the mixing chamber in less than about 0.25 of the mean residence time of the flowing stream in the mixing chamber and at least about 95% of the process cheese-type formulation passes through the mixing chamber within about two mean residence times of the flowing stream in the mixing chamber.

2. A method in accordance with claim 1 wherein said mixing chamber is an auger conveyor, said auger conveyor being divided into at least three mixing sections by affixing at least two baffles to the shaft of said conveyor.

3. A method in accordance with claim 1 wherein a major portion of said flowing stream is subjected to shear within said mixing chamber of at least 5(1/sec).

4. A method in accordance with claim 3 wherein said major portion is at least about 70%.

5. A method in accordance with claim 1 wherein only a minor portion of said flowing stream is subjected to shear greater than about 1000(1/sec).

6. A method in accordance with claim 5 wherein said minor portion is about 10%.

7. A method in accordance with claim 1 wherein only a minor portion of said flowing stream is subjected to shear greater than 500 (1/sec).

8. A method in accordance with claim 7 wherein said minor portion is about 10%.

9. A method in accordance with claim 1 wherein said steam injection is sufficient to heat said flowing stream to a temperature of from about 150° F. to about 250° F.

10. A method in accordance with claim 1 wherein the residence time of said flowing stream within said mixing chamber is from about 30 seconds to about 8 minutes.

11. A method in accordance with claim 1 wherein the residence time within said mixing chamber is from about 2 minutes to about 4 minutes.

* * * * *